United States Patent
Candelore et al.

(10) Patent No.: US 11,818,414 B2
(45) Date of Patent: Nov. 14, 2023

(54) TELEPRESENCE THROUGH OTA VR BROADCAST STREAMS

(71) Applicant: Sony Group Corporation, Tokyo (JP)

(72) Inventors: Brant Candelore, Poway, CA (US); Adam Goldberg, Fairfax, VA (US); Fred Ansfield, San Diego, CA (US); Graham Clift, Poway, CA (US); Loren Pineda, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/569,969

(22) Filed: Jan. 6, 2022

(65) Prior Publication Data

US 2023/0037736 A1 Feb. 9, 2023

Related U.S. Application Data (60) Provisional application No. 63/260,023, filed on Aug. 6, 2021.

(51) Int. Cl.
*H04N 21/41* (2011.01)
*H04N 21/436* (2011.01)
*H04N 21/81* (2011.01)
*H04N 13/30* (2018.01)
*H04N 13/344* (2018.01)
*H04N 13/351* (2018.01)
*H04N 13/356* (2018.01)

(52) U.S. Cl.
CPC ........ *H04N 21/4122* (2013.01); *H04N 13/30* (2018.05); *H04N 13/344* (2018.05); *H04N 13/351* (2018.05); *H04N 13/356* (2018.05); *H04N 21/43615* (2013.01); *H04N 21/816* (2013.01); *H04N 2013/405* (2018.05)

(58) Field of Classification Search
CPC .. H04N 21/4122; H04N 13/30; H04N 13/344; H04N 13/351; H04N 13/356; H04N 21/43615; H04N 21/816; H04N 2013/405; H04N 21/6125; H04N 21/6143
USPC ........................................................ 348/51
See application file for complete search history.

(56) References Cited

U.S. PATENT DOCUMENTS

| 10,284,753 | B1 * | 5/2019 | Naik ................... G06T 7/596 |
| 11,095,856 | B2 | 8/2021 | Valli | |
| 2018/0103283 | A1 * | 4/2018 | Liu ................ H04N 21/44209 |

(Continued)

FOREIGN PATENT DOCUMENTS

| WO | 2020264088 A1 | 12/2020 |
| WO | 2021101934 A1 | 5/2021 |

OTHER PUBLICATIONS

Mauricio Aracena, "Live VR end-to-end workflows: real-life deployments and advances in VR and network technology", 3GPP Draft; S4-210408, 3rd Generation Partnership Project (3GPP), Mobile Competence Centre ; 650, Route Des Lucioles ; F-06921 Sophia-Antipolis Cedex; France , No. Virtual Mar. 31, 2021 (Mar. 21, 2021), XP051991692.

*Primary Examiner* — Christopher S Kelley
*Assistant Examiner* — Ana Picon-Feliciano
(74) *Attorney, Agent, or Firm* — John L. Rogitz; John M. Rogitz (57) ABSTRACT

Techniques are described for expanding and/or improving the Advanced Television Systems Committee (ATSC) 3.0 television protocol in robustly delivering the next generation broadcast television services. Telepresence is provided through over-the-air (OTA) virtual reality (VR) broadcast streams.

19 Claims, 6 Drawing Sheets

(56) References Cited

U.S. PATENT DOCUMENTS

| | | |
|---|---|---|
| 2018/0316948 A1 | 11/2018 | Todd |
| 2020/0194033 A1* | 6/2020 | Huang .................. G06T 3/4038 |
| 2020/0245017 A1 | 7/2020 | Ganschow |
| 2020/0275134 A1* | 8/2020 | Bang ................ H04N 21/21805 |
| 2020/0412565 A1 | 12/2020 | Sanders |
| 2021/0243418 A1 | 8/2021 | Ojala |

* cited by examiner

TELEPRESENCE THROUGH OTA VR BROADCAST STREAMS

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high-definition televisions to wireless telephones. ATSC 3.0 also orchestrates coordination between broadcast content (referred to as "over the air" or OTA) and related broadband delivered content and services (referred to as "over the top" or OTT). ATSC 3.0 is designed to be flexible so that as technology evolves, advances can be readily incorporated without requiring a complete overhaul of any related technical standard.

SUMMARY

One hundred eighty/three hundred sixty-degree)(180°/360°) field of view, 4K or 8K or higher resolution video can be panned on a PC, tablet or smart phone using a mouse or touchscreen. Using goggles, the video can be panned with a hand controller or head motion. VR goggles can sense the natural turning or tilting of the head in order to pan the image shown within the googles to make the wearer feel present at the location as if being "teleported".

As envisioned herein, 180/360 video can be monoscopic or stereoscopic. A flat display as used herein may present monoscopic or stereoscopic video, with stereoscopic video being used to render 3D video and monoscopic video typically being considered to be 2D video. "Flat display" or "flat video" as used herein means a video in which the entire image that is processed is limited to a display, typically with an aspect ratio of 16×9, at whatever the received resolution is, with no ability to pan. Thus, "flat" video may be considered to be the "main view" video of a 180/360 video. It might be where the director or content creator wants to focus the user's attention. The "surround video" is not shown. The "flat video" plus the "surround video" make up the entirely of a 180/360 video.

Examples can include providing, along with a normal flat feed, a 180°/360° surround feed of live news events. Live news events such as at a location of an accident, tornado, demonstration, political rally, etc. can be shown as a 360° feed for 180°/360° spherical representation on the goggles. And it is not just live news events, but live "human interest" stories where people and organizations are showcased. A 360° feed can provide the viewer a better idea as to they are about because they are able to "look around" and see things that a flat feed cannot show. As people without goggles watch the normal flat video on a TV, people with goggles can pan around the entire scene by means of panning the 180°/360° surround feed. For TVs that support the display of 180°/360° video, panning may be accomplished using the remote control by pressing the up, down, left, and right buttons on the remote control. The video can be monoscopic or stereoscopic. Stereoscopic video can deliver separate images to each eye, and this called "3D" video. 3D video can be supported with 180°/360° video, but not all 180°/360° video is 3D. Present principles also apply to travel tourist content and to any show or content filmed in 180°/360° VR such as concerts, motor bike racing, snowboarding, or hiking. Many VR videos are filmed monoscopically, e.g., delivering the same content to each eye, and often with the focus set to infinity which minimizes the nausea that users experienced with 3D. Monoscopic video can deliver a very satisfactory experience of "being there" and telepresence.

Accordingly, a digital television apparatus includes at least one receiver with at least one processor programmed with instructions to configure the processor to present a flat video of an event on a main display and present a one hundred eighty or three hundred sixty-degree (180° or) 360° video of the event on a virtual reality (VR) headset.

In another aspect, in digital television in which at least one receiver can receive broadcast signals, a method includes receiving at least a first broadcast video signal. The method also includes presenting content in the first broadcast video signal on at least one normal flat display and presenting 180°/360° video of the content on at least one display. The method includes, responsive to at least one command, panning the 180°/360° video on the at least one display.

In some embodiments the at least one display includes a virtual reality (VR) headset.

In some embodiments the at least one display includes the flat display.

In some implementations the 180°/360° video is received in the first broadcast video stream, the first broadcast stream includes no other video of the content, and the panning includes panning video on the flat display.

In other embodiments the 180°/360° video is received in the first broadcast video stream, the first broadcast stream includes no other video of the content, and the 180°/360° video is presented as flat video on the flat display as a backwardly compatible content view.

In some implementations the 180°/360° video is received in the first broadcast video stream and content therein is presented on the flat display, and the method includes sending the content from the flat display to the VR headset. In other implementations the 180°/360° video is received in the first broadcast video stream and content therein is presented on the flat display, and the method includes sending the content to the VR headset without passing through the flat display.

The 180°/360° video may be received in the first broadcast video stream along with a flat feed of content in the 180°/360° video. Or, the 180°/360° video may be received from an over-the-top (OTT) source.

In another aspect, an apparatus includes at least one receiver assembly configured to receive at least a first broadcast video signal and present content in the first broadcast video signal on at least one flat display. The receiver assembly also is configured to present 180°/360° video of the content on at least one display. Responsive to at least one command, the assembly is configured to pan the 180°/360° video on the at least one display.

The details of the present application, both as to its structure and operation, can best be understood in reference to the accompanying drawings, in which like reference numerals refer to like parts, and in which:

DETAILED DESCRIPTION

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable universal serial bus (USB) thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

A recitation of "having at least one of A, B, and C" (likewise "having at least one of A, B, or C" and "having at least one of A, B, C") includes A alone, B alone, C alone, A and B together, A and C together, B and C together, and/or A, B, and C together, etc.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 1:
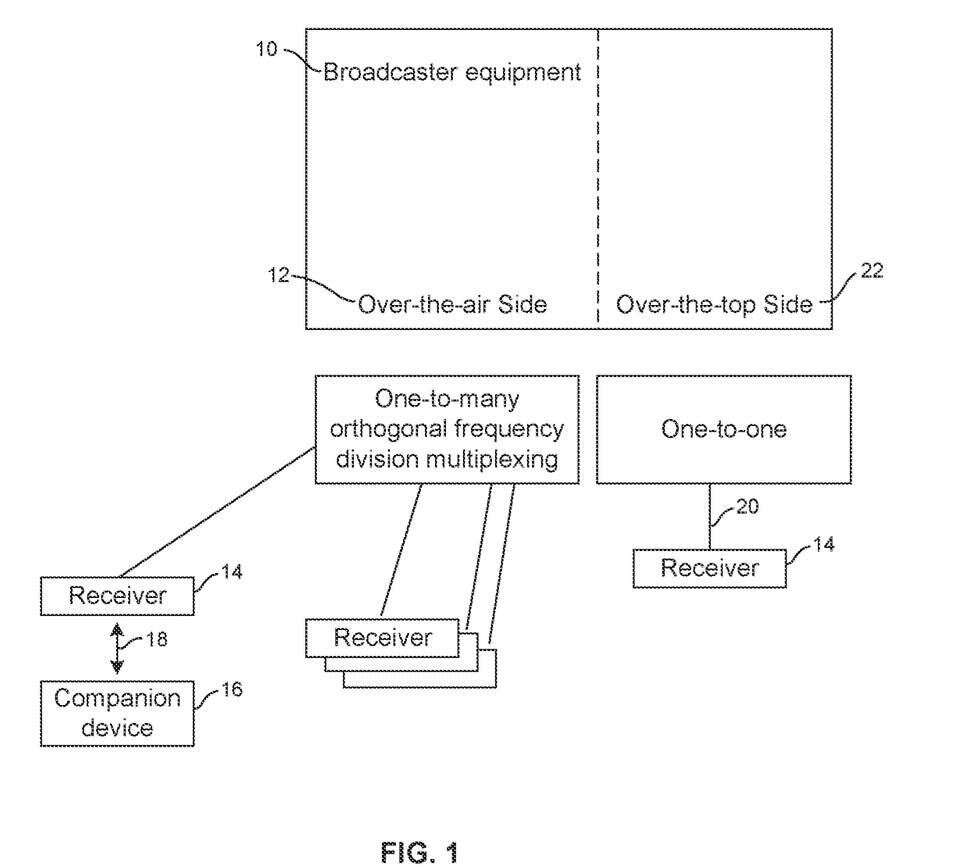
FIG. 1 illustrates an Advanced Television Systems Committee (ATSC) 3.0 system.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, virtual reality (VR) headsets such as computer simulation 180°/360° headsets such as computer game headsets such as a Sony PlayStation® headset and the like over a short range, typically wireless link 18 that may be implemented by Bluetooth®, low energy Bluetooth, Wireless HDMI, Amimon wireless HD video link, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
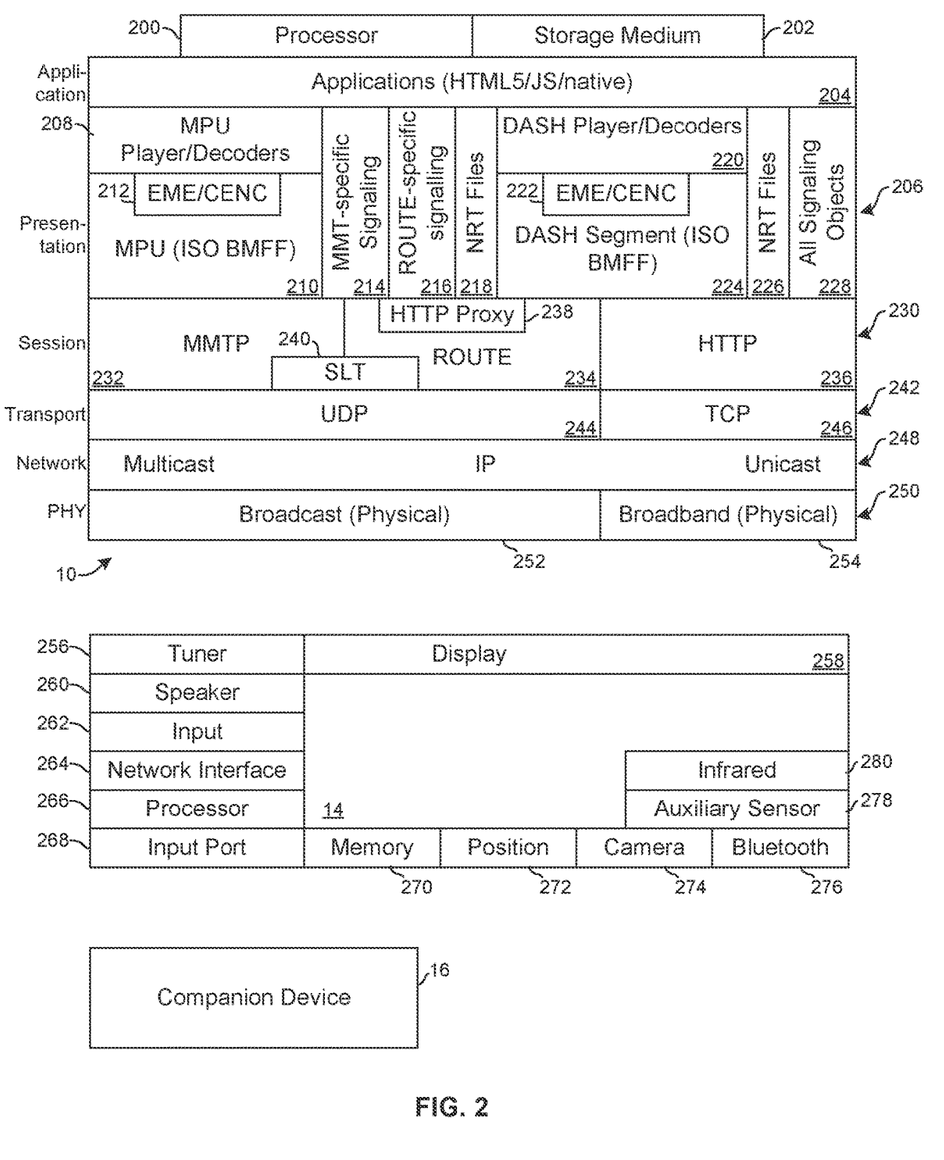
FIG. 2 illustrates components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format. To support various embodiments of the present invention, DASH segments encode various media content components types such as audio, video, or text. It is anticipated that there could be more than one video type— one encompassing the legacy main view—and new video type encompassing the surround video. Legacy players/decoders decode the legacy main view based legacy video type, while enhanced players pan and decode the additional video type that includes the surround video.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g., communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high-definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player. The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g., all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor or inertial measurement unit (IMU) and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
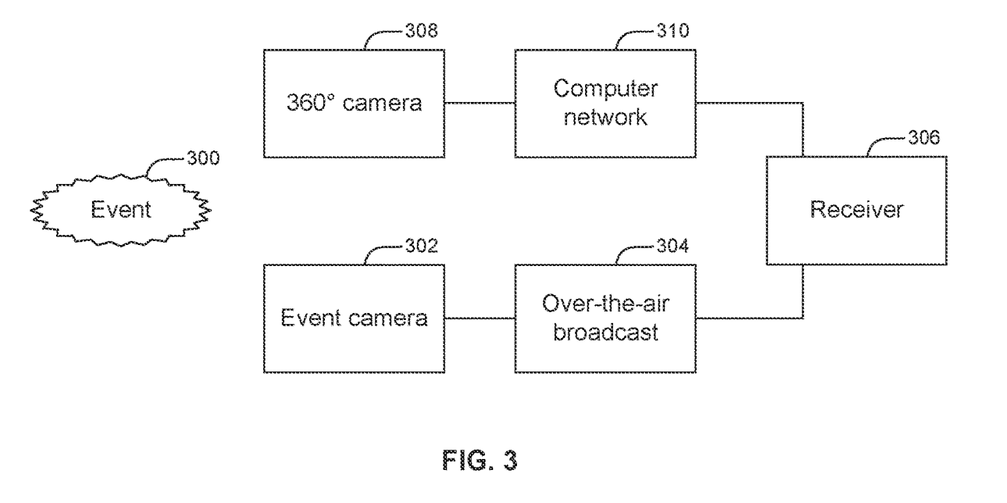
FIG. 3 illustrates a first technique for providing telepresence video.

Refer now to FIG. 3. A live event 300 may be filmed for broadcast by an event camera 302 that transmits real, normal flat images via an OTA broadcast transmitter 304 to one or more receivers 306. Simultaneously, a movable one hundred eighty/three hundred sixty-degree) (180°/360°) 4K or 8K or higher camera 308 films the event 300 in every direction and sends its output to the receiver 306 via an OTT source 310 such as an Internet server. The (180°/360°) 4K or 8K or higher camera 308 may provide a surround view of the event and may also provide a greater elevation view of the event than provided by the flat camera 302. In an example, the) (180°/360°) 4K or 8K or higher camera 308 may be mounted on a drone to film the event 300. The (180°/360°) 4K or 8K or higher camera 308 may output 180°/360° video if desired. AC-4 audio for example may accompany the (180°/360°) 4K or 8K or higher video. The (180°/360°) 4K or 8K or higher camera 308 may capture the event 300 in a large angle format.

Figure 4:
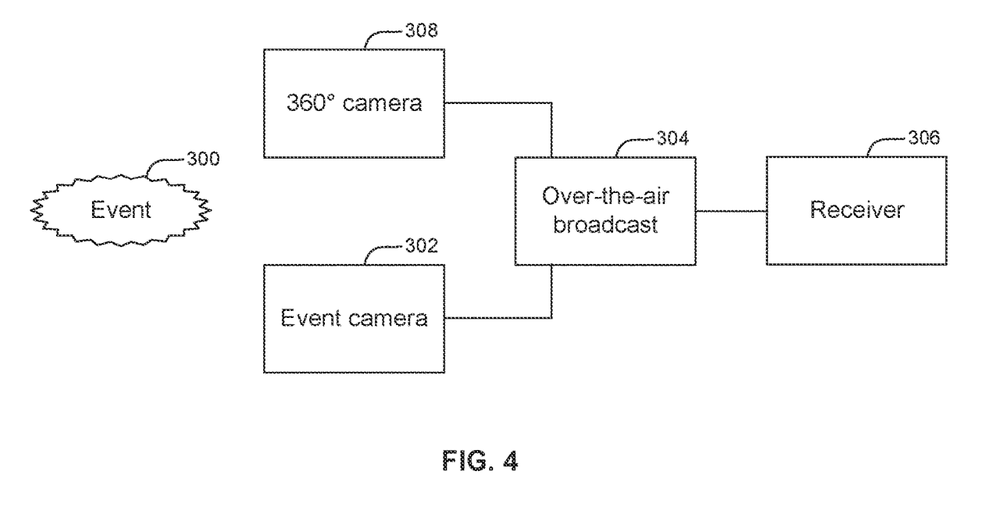
FIG. 4 illustrates a second technique for providing telepresence video.

FIG. 4 on the other hand illustrates an embodiment in which both outputs of the flat camera 302 and (180°/360°) 4K or 8K or higher camera 308 are sent via OTA broadcast 304 to the receiver 306. The two video streams produced by the cameras 302, 308 may be sent in a single physical layer pipe (PLP) or related PLPs and may be accompanied by signaling that both video streams are available, identifying each one for what it is, e.g., flat or (180°/360°) 4K or 8K.

In another embodiment the flat camera 302 may be omitted from FIG. 4 and only the video stream from the (180°/360°) 4K or 8K or higher camera 308 may be sent OTA to receivers for processing as described below. In this embodiment, the stream can have a main view using the main video content type.

Figure 5:
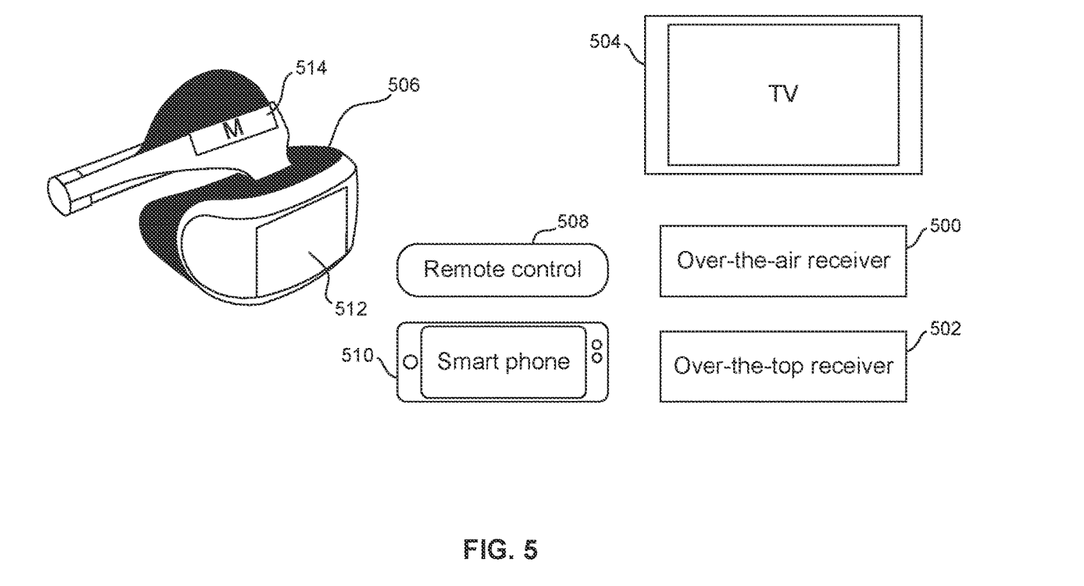
FIG. 5 illustrates an example specific system consistent with present principles.

FIG. 5 illustrates that a receiver assembly may include an OTA receiver 500, and OTT receiver 502, and a flat display 504 such as a TV. The receiver assembly may further include virtual reality (VR) headset 506 such as goggles and one or more devices for panning video such as 180°/360° video presented on the VR headset 506. These devices may include a point and click mechanism such as a joystick or buttons on a remote control (RC) 508 for the TV, a touchscreen on a smart phone 510, or a touchscreen or touchpad 512 on the headset 506. The pan devices may also include one or more motion sensors 514 in the headset 506 or RC 508. The headset may have a RC 508 in lieu of a touchscreen or touchpad 512 to accomplish panning. Combinations of the above maybe used for panning. Each of the components shown in FIG. 5 may include appropriate components from FIG. 2 including processors, storage devices, and network interfaces.

Figure 6:
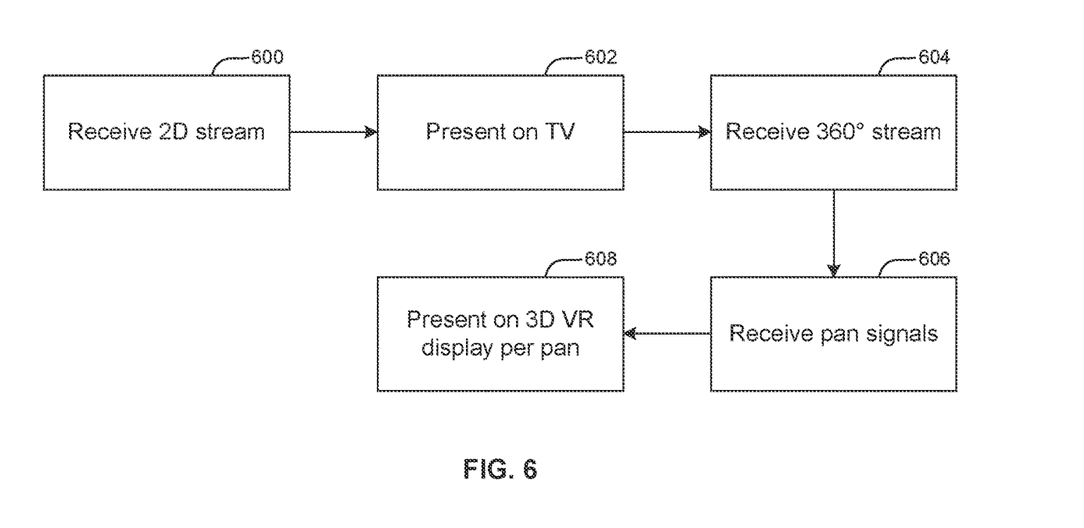
FIG. 6 illustrates example logic in example flow chart format consistent with present principles.

FIG. 6 illustrates example logic that may be executed by one or more processors in the receiver assembly of FIG. 5. Commencing at block 600, a flat video stream is received, e.g., OTA or derived from a single (180°/360°) 4K or 8K or higher video stream when no flat event camera 302 is provided. The (180°/360°) 4K or 8K or higher video stream can have a main view which is essentially the flat view stream. This flat stream may be presented on, e.g., the TV 504 in FIG. 5 at block 602.

Moving to block 604, the (180°/360°) 4K or 8K or higher video stream is received OTA or OTT as described above and any pan signals received at block 606. The (180°/360°) 4K or 8K or higher 180°/360° video may be presented at block 308 on the VR headset 506 shown in FIG. 5.

Figure 7:
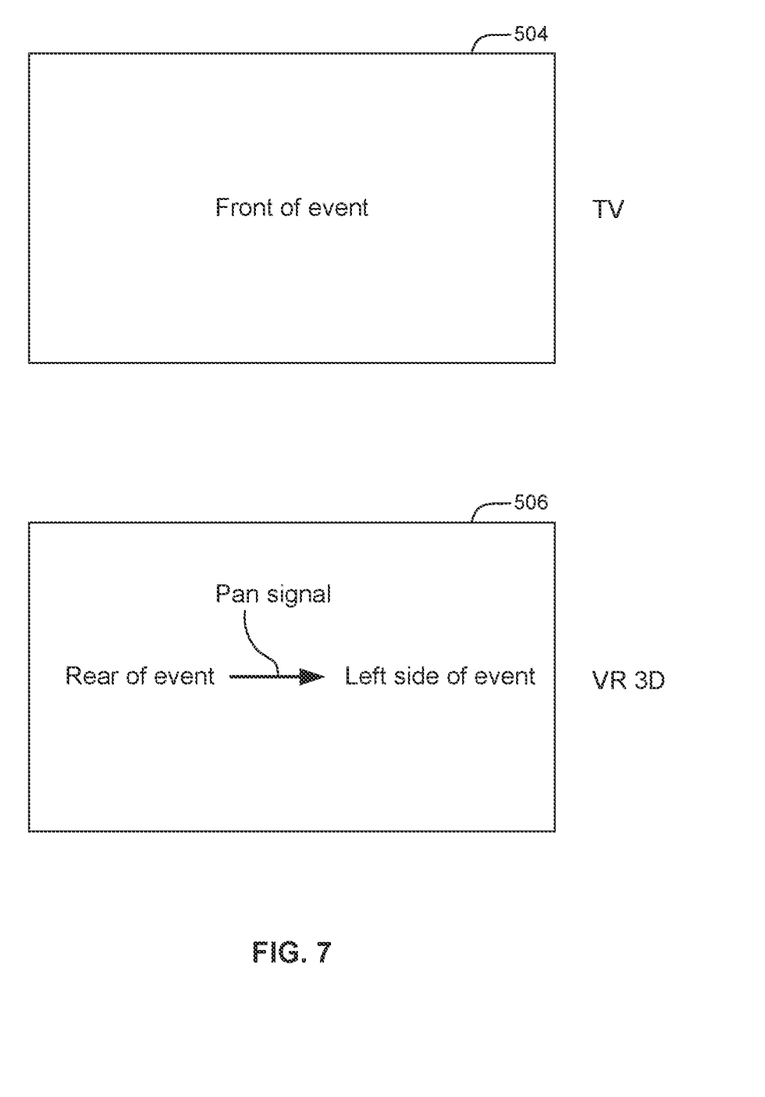
FIG. 7 illustrates a receiver system with two displays, one for presenting a flat view of an event and the other for providing a 360-degree VR telepresence view of the event.

FIG. 7 illustrates that the flat stream of the event 300 in FIG. 3 can be presented on the TV 504 while simultaneously a (180°/360°) 4K or 8K or higher 180°/360° version of the same event 300 can be presented on the headset 506 with a panning feature indicated by the arrow 700 to allow a wearer of the headset 506 to be virtually present at the event 300 and move his head or manipulate another panning device, e.g. RC 508, to "look around" the event as if he was actually there. Note that panning includes both azimuthal panning and elevational panning.

Figure 8:
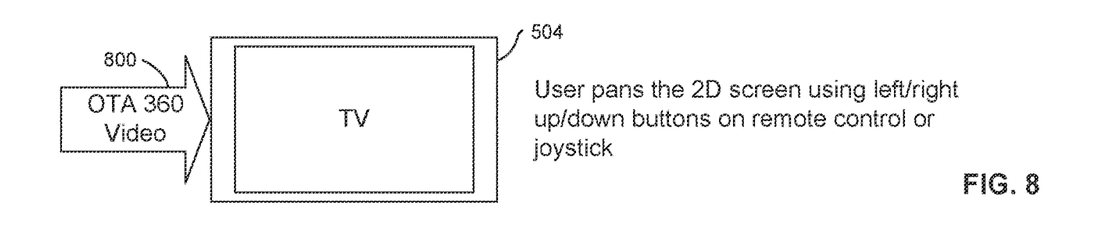
FIG. 8 illustrates a first technique for providing 360° telepresence video as flat video on a TV that can be panned.

FIG. 8 illustrates a first technique in which (180°/360°) 4K or 8K or higher video 800 is received OTA by the TV 504 for presentation as flat video on the TV. A viewer can pan the video on the TV 504 using any of the input devices described above, e.g., joystick or buttons on the RC 508, touchscreen on the smart phone 510, etc.

Figure 9:
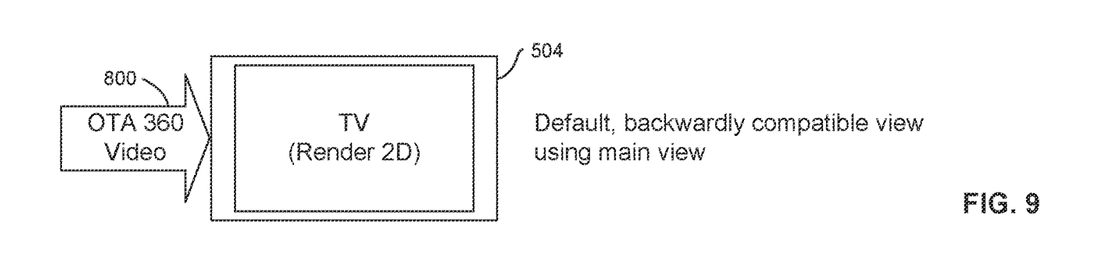
FIG. 9 illustrates a second technique for providing 360° telepresence video as flat backwardly compatible video on a TV.

FIG. 9 illustrates the (180°/360°) 4K or 8K or higher video 800 is received OTA by the TV 504 and rendered on the TV as flat to establish a backward compatible view without panning.

Figures 10, 11:
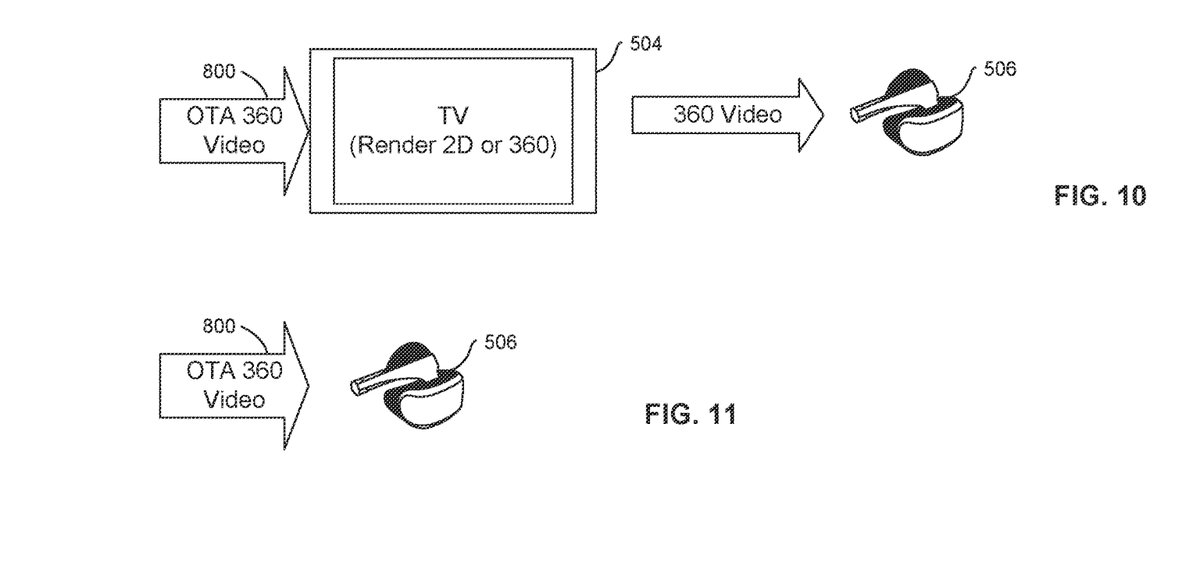
FIG. 10 illustrates a third technique for providing 360° telepresence video on a TV and on VR goggles.
FIG. 11 illustrates a fourth technique for providing 360° telepresence video directly to VR goggles.

FIG. 10 illustrates (180°/360°) 4K or 8K or higher video 800 may be received OTA by the TV 504 and rendered into flat for presentation on the TV, with the (180°/360°) 4K or 8K or higher video 800 being relayed from the TV to the headset 506, e.g., via Bluetooth or Wi-Fi, for presentation of 180°/360° on the headset that can pan the view as described.

FIG. 11 illustrates (180°/360°) 4K or 8K or higher video 800 may be received OTA or OTT directly by the headset 506 for presentation of 180°/360° on the headset that can pan the view as described, without the need for the TV 504 to intervene to relay the 180°/360° video.

It will be appreciated that whilst present principals have been described with reference to some example embodiments, these are not intended to be limiting, and that various alternative arrangements may be used to implement the subject matter claimed herein.

What is claimed is:

1. In digital television in which at least one receiver can receive broadcast signals, a method, comprising:
   receiving at least a first broadcast video signal;
   presenting content in the first broadcast video signal on at least one flat display; and
   presenting 180°/360° video of the content on at least one display, wherein the content presented on the at least one flat display is from at least one flat video camera and the 180°/360° video is from at least one 180°/360° camera and the flat video content and 180°/360° video are sent, to the receiver, via over-the-air (OTA) broadcast in at least one physical layer pipe (PLP) accompanied by signaling that both flat video content and 180°/360° video are available.

2. The method of claim 1, wherein the at least one display comprises a virtual reality (VR) headset.

3. The method of claim 1, wherein the 180°/360° video is received in the first broadcast video stream, the first broadcast stream comprising no other video of the content, and the panning comprises panning video on the flat display.

4. The method of claim 1, wherein the 180°/360° video is received in the first broadcast video stream, the first broadcast stream comprising no other video of the content, and the 180°/360° video is presented as flat video on the flat display as a backwardly-compatible content view.

5. The method of claim 2, wherein the 180°/360° video is received in the first broadcast video stream and content therein is presented on the flat display, and the method comprises sending the content from the flat display to the VR headset.

6. The method of claim 2, wherein the 180°/360° video is received in the first broadcast video stream and content therein is presented on the flat display, and the method comprises sending the content to the VR headset without passing through the flat display.

7. The method of claim 1, wherein the 180°/360° video is received in the first broadcast video stream along with a flat feed of content in the 180°/360° video.

8. The method of claim 1, wherein the 180°/360° video is received from an over-the-top (OTT) source.

9. The method of claim 1, wherein the digital television receiver comprises an advanced television systems committee (ATSC) 3.0 receiver.

10. An apparatus comprising:
at least one receiver assembly configured to:
receive at least a first broadcast video signal;
present flat video content in the first broadcast video signal on at least one flat display;
present 180°/360° video of the content on at least one display, wherein the flat video content is from at least one flat video camera and the 180°/360° video is from at least one 180°/360° camera and the flat video content and 180°/360° video are sent, to the receiver assembly, via over-the-air (OTA) broadcast in at least one physical layer pipe (PLP) accompanied by signaling that both the flat video content and the 180°/360° video are available, identifying each.

11. The apparatus of claim 10, wherein the at least one display comprises a virtual reality (VR) headset.

12. The apparatus of claim 10, wherein the at least one display comprises the flat display.

13. The apparatus of claim 10, wherein the receiver assembly is configured to, responsive to at least one command, pan the 180°/360° video on the at least one display, and the 180°/360° video is received in the first broadcast video stream, the first broadcast stream comprising no other video of the content, and the pan comprises panning video on the flat display.

14. The apparatus of claim 10, wherein the 180°/360° video is received in the first broadcast video stream, the first broadcast stream comprising no other video of the content, and the 180°/360° video is presented as flat video on the flat display as a backwardly-compatible content view.

15. The apparatus of claim 11, wherein the 180°/360° video is received in the first broadcast video stream and content therein is presented on the flat display, and the instructions are executable to send the content from the flat display to the VR headset.

16. The apparatus of claim 11, wherein the 180°/360° video is received in the first broadcast video stream and content therein is presented on the flat display, and the instructions are executable to send the content to the VR headset without passing through the flat display.

17. The apparatus of claim 10, wherein the 180°/360° video is received in the first broadcast video stream along with a flat feed of content in the 180°/360° video.

18. The apparatus of claim 10, wherein the 180°/360° video is received from an over-the-top (OTT) source.

19. A digital television apparatus comprising:
at least one receiver comprising at least one processor programmed with instructions to configure the processor to:
present a flat video of an event on a main display; and
present a one hundred eighty or three hundred sixty-degree (180° or 360°) video of the event on a virtual reality (VR) headset, wherein the flat video is from at least one flat video camera and the 180° or 360° video is from at least one 180°/360° camera and the flat video content and 180° or 360° video are sent to the receiver via over-the-air (OTA) broadcast in at least one physical layer pipe (PLP) accompanied by signaling that both the flat video content and the 180° or 360° video are available.

* * * * *